(12) United States Patent
Nozarian et al.

(10) Patent No.: US 8,156,453 B1
(45) Date of Patent: Apr. 10, 2012

(54) METHOD AND SYSTEM IDENTIFYING AND LOCATING IP BLOCKS AND BLOCK SUPPLIERS FOR AN ELECTRONIC DESIGN

(75) Inventors: Nozar Nozarian, San Jose, CA (US); Catherine Jones, Bend, OR (US)

(73) Assignee: Cadence Design Systems, Inc., San Jose, CA (US)

(*) Notice: Subject to any disclaimer, the term of this patent is extended or adjusted under 35 U.S.C. 154(b) by 527 days.

(21) Appl. No.: 12/252,577

(22) Filed: Oct. 16, 2008

(51) Int. Cl.
G06F 17/50 (2006.01)
G06F 9/455 (2006.01)
G06Q 10/00 (2012.01)
G06Q 90/00 (2006.01)

(52) U.S. Cl. .......................... 716/100; 716/132; 705/500

(58) Field of Classification Search .................. 716/100, 716/132; 705/7, 8, 10, 51, 500
See application file for complete search history.

(56) References Cited

U.S. PATENT DOCUMENTS

| | | | |
|---|---|---|---|
| 5,862,223 A | 1/1999 | Walker et al. | |
| 5,878,408 A | 3/1999 | Van Huben et al. | |
| 5,933,356 A | 8/1999 | Rostoker et al. | |
| 6,058,426 A | 5/2000 | Godwin et al. | |
| 6,102,961 A | 8/2000 | Lee et al. | |
| 6,141,724 A | 10/2000 | Butler et al. | |
| 6,269,467 B1 | 7/2001 | Chang et al. | |
| 6,578,174 B2 * | 6/2003 | Zizzo | 716/103 |
| 7,353,467 B2 * | 4/2008 | Robertson et al. | 716/138 |
| 7,899,896 B2 * | 3/2011 | Kitagawa et al. | 709/223 |
| 2004/0237054 A1 * | 11/2004 | Tsai et al. | 716/1 |
| 2005/0034087 A1 * | 2/2005 | Hamlin et al. | 716/3 |
| 2006/0294180 A1 * | 12/2006 | Lovisa | 709/203 |
| 2008/0270805 A1 * | 10/2008 | Kean | 713/189 |

FOREIGN PATENT DOCUMENTS

| | | |
|---|---|---|
| EP | 0433066 | 6/1991 |
| EP | 0944002 | 9/1999 |
| EP | 1063599 A2 | 12/2000 |
| WO | 0142969 | 6/2001 |
| WO | 0165422 A2 | 9/2001 |
| WO | 0165423 | 9/2001 |

OTHER PUBLICATIONS

"Integrated Portal for Chip Planning Launched by Chip Estimate Corporation," http://www.chipestimate.com/archives/pressreleases/releasesCE071006.html, Jul. 10, 2006.

* cited by examiner

Primary Examiner — Stacy Whitmore
Assistant Examiner — Magid Dimyan
(74) Attorney, Agent, or Firm — Vista IP Law Group, LLP

(57) ABSTRACT

An improved approach for locating and identifying IP for an electronic design is described. The present approach addresses the situation in which an IP catalog does not contain any IP which matches the exact requirements of an electronic design for which the IP is to be used or integrated.

28 Claims, 7 Drawing Sheets

| Macro | Category | Description | Dimensions | Power | Technology node | Date updated | Hidden? |
|---|---|---|---|---|---|---|---|
| Macro 202 | AMS clock IP | .045 µm 25MHz-190MHz | 200 x 500 | 100 | 45 nm XYZ/L025N | 2008 | No |
| Macro 204 | AMS clock IP | .090 µm 40MHz-200MHz | 400 x 700 | 200 | 90 nm XYZ/L045N | 2007 | No |
| . . . | . . . | . . . | . . . | . . . | . . . | . . . | . . . |

Figure 4

| IP Vendor | IP Name | Description |
|---|---|---|
| Company A | IP 216 | Comparator |
| Company B | IP 218 | Clock PLL |
| . . . | . . . | . . . |

Figure 5

| User | Contact / Email | Joined Date | Company | Origin | Macro | Date | Week | Qtr | All |
|---|---|---|---|---|---|---|---|---|---|
| Joe | Joe@Joe | 01/01/08 | Joe Co. | IP Request | None | 10/01/08 | 1 | 1 | 1 |
| Jim | Jim@Jim | 05/01/08 | Jim Co. | Web Access | X2 | 10/01/08 | 0 | 2 | 10 |
| Jay | Jay@Jay | 09/01/08 | Jay Co. | IP Usage | Z5 | 10/01/08 | 0 | 1 | 4 |
| . . . | . . . | . . . | . . . | . . . | . . . | . . . | . . . | . . . | . . . |

Figure 6

METHOD AND SYSTEM IDENTIFYING AND LOCATING IP BLOCKS AND BLOCK SUPPLIERS FOR AN ELECTRONIC DESIGN

BACKGROUND

The invention is directed to an improved approach for designing, testing, and manufacturing integrated circuits.

A semiconductor integrated circuit (IC) has a large number of electronic components, such as transistors, logic gates, diodes, wires, etc., that are fabricated by forming layers of different materials and of different geometric shapes on various regions of a silicon wafer.

Many phases of physical design may be performed with computer aided design (CAD) tools or electronic design automation (EDA) systems. To design an integrated circuit, a designer first creates high level behavior descriptions of the IC device using a high-level hardware design language. An EDA system typically receives the high level behavior descriptions of the IC device and translates this high-level design language into netlists of various levels of abstraction using a computer synthesis process. A netlist describes interconnections of nodes and components on the chip and includes information of circuit primitives such as transistors and diodes, their sizes and interconnections, for example.

An integrated circuit designer may use a set of layout EDA application programs to create a physical integrated circuit design layout from a logical circuit design. The layout EDA application uses geometric shapes of different materials to create the various electrical components on an integrated circuit and to represent electronic and circuit IC components as geometric objects with varying shapes and sizes. After an integrated circuit designer has created an initial integrated circuit layout, the integrated circuit designer then verifies and optimizes the integrated circuit layout using a set of EDA testing and analysis tools. Verification may include, for example, design rule checking to verify compliance with rules established for various IC parameters.

In recent years, constant innovation in silicon process technology has drastically reduced the price and increased the performance and functionality of integrated circuit devices, thus stimulating the development of the electronics manufacturing and information processing industries. In turn, these fast growing industries impose increasing demands on the integrated circuit design system developers for still faster, cheaper, and more powerful devices.

To address these demands, many designers of electronic systems have moved to a methodology known as Block Based Design ("BBD"), in which a system is designed by integrating a plurality of existing component design blocks. These pre-designed blocks may be obtained from internal design teams or licensed from other design companies. Moreover, pre-designed blocks may be developed to meet different design requirements and constraints.

In recent years, many companies and organizations have created entire libraries of component design blocks and other units of electronic design (also referred to in the art as "intellectual property blocks", "IP blocks", "IP components", or "cores"), and have created businesses out of licensing or selling these IP blocks to other companies that use these design blocks to create an electronic product. As of the filing of this application, there exist a large number of companies that supply such IP blocks to customers, and many thousands of such IP blocks available to be integrated into a customer's own design.

One of the significant challenges faced by a modern designer is that, given the large number of potential suppliers of IP blocks, how the designer can best and most efficiently identify which of the suppliers is able to provide an IP block that will suit the needs of the designer for a given design project. This is not a trivial problem given the existence of such a large number of vendors and suppliers of IP blocks and the even larger number of IP blocks that are available for licensing or purchase. The fact that certain hard macros are available on specific, predefined processes adds another layer of complexity in terms of IP selection.

SUMMARY

Some embodiments of the present invention provide an improved approach for locating and identifying IP for an electronic design. The present approach addresses the situation in which an IP catalog does not contain any IP which matches the exact requirements of an electronic design for which the IP is to be used or integrated.

Embodiments of the present invention provide improved and systems for connecting suppliers and consumers of IP blocks together. According to some embodiments, concierge-like services are provided to facilitate a connection between a consumer of electronic IP and the provider or vendor of the electronic IP. Even if the user cannot identify or locate the suitable IP or IP vendor on his or her own, the present invention provides a framework for establishing communications between the consumer and any appropriate IP vendors for the requested IP.

Other additional objects, features, and advantages of the invention are described in the detailed description, figures, and claims.

BRIEF DESCRIPTION OF FIGURES

FIG. 4 shows an interface and information for IP to be registered at a portal site according to some embodiments of the invention.

FIG. 5 shows an interface and information based upon a search of IP at a portal site according to some embodiments of the invention.

FIG. 6 shows an interface and information for managing sales leads based upon a user using or searching for IP at a portal site according to some embodiments of the invention.

DETAILED DESCRIPTION

Embodiments of the present invention provide improved and systems for connecting suppliers and consumers of IP blocks together. According to some embodiments, concierge-like services are provided to facilitate a connection between a consumer of electronic IP and the provider or vendor of the electronic IP. Even if the user cannot identify or locate the suitable IP or IP vendor on his or her own, the present invention provides a framework for establishing communications between the consumer and any appropriate IP vendors for the requested IP.

Figure 1:
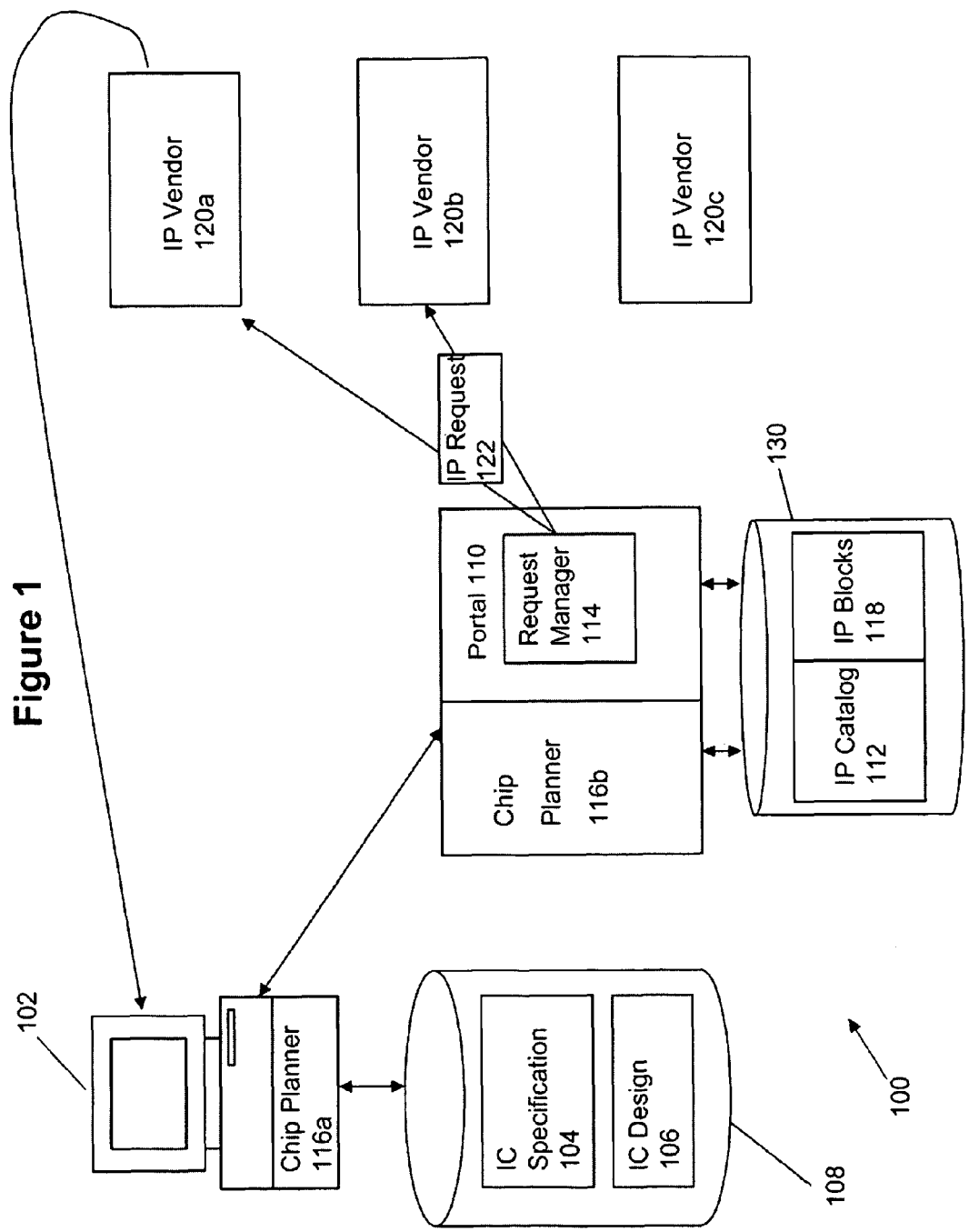
FIG. 1 depicts an architecture of a system for locating and identifying IP according to some embodiments of the invention.

FIG. 1 shows an architecture of a system 100 for facilitating identification and location of IP blocks according to one embodiments of the invention. System 100 comprises one or more users at one or more user stations 102 that access a portal 110 to research, identify, and/or obtain IP blocks. The users at user station 102 correspond to any individual, organization, or other entity that uses system 100 for locating IP blocks for either research purposes or to integrate the IP blocks in an electronic design 106. The use stations 102 could be implemented using any suitable platform. For example, user station 102 may be implemented as a remote workstation networked to the portal 110 across the internet, where the data from the portal 110 is configured and displayed using a web browser.

The user station 102 may be associated with a database 108 or other computer readable medium that holds a data regarding the user's electronic design 106 and/or one or more specifications 104 relating to the electronic design 106. The one or more specifications 104 comprise any set of information or parameters that the user has developed to determine the requirements of the user's electronic design 106 and of cells and blocks that are needed to implement the electronic design 106. For example, the specification could include details of requirements for one or more IP blocks for the electronic design 106, such as the function, process, technology node, size, acceptable power parameters, acceptable leakage parameters, and gate count of a desired IP block.

The portal 110 is a network-accessible site that facilitates access to a database 130 containing a catalog 112 of IP blocks 118 that are subject to purchase or licensing by the user at user station 102. The IP catalog 112 comprises a listing of the IP blocks 118 that have been registered at portal 110 by IP vendors 120a, 120b, and 120c. Based upon the specifications 104 developed by the user for the electronic design 106, the user at user station 102 will access portal 110 to search the IP catalog 112 for any IP blocks 118 that suitably correspond to the requirements of the specification 104.

The information in the IP catalog 112 regarding IP blocks 118 is provided by IP vendors 120a, 120b, and 120c. Each IP vendor 120a-c corresponds to a supplier of an item of IP that is listed in IP catalog 112, or is nevertheless registered as a source of IP even if not presently listing any items of IP in IP catalog 112.

The user that seeks to implement an electronic product and would like to obtain information about suitable IP 118 for the design 106 can access the IP catalog 112 from the portal 110. The user would search the IP catalog 112 using any suitable search criteria to obtain a list of IP blocks 118 that match the search criteria entered by the user. Based upon the search results, the user is provided with information relevant to making a decision to either license or purchase the IP block 118 for insertion into the user's design 106.

In certain embodiments, the user may also access a chip planner 116a or 116b (which may also be referred to as a "chip estimator"). The chip planner may be implemented with a chip planner client component 116b that resides at the user station 102 and/or a chip planner server component 116b that resides at a remote server/portal location. In some embodiment, the chip planner may be implemented as a web-based tool that resides at a server and is accessible using any web-enabled browser. The chip planner 116a-b provides a planning tool to plan, outline, and analyze the characteristics and production requirements of an electronic product. For example, the chip planner 116a-b could provide an early stage estimation of anticipated production characteristics to an electronic product by analyzing the specifications and requirements of an electronic design 106. By analyzing the functional and physical requirements of an electronic design 106, the chip planner 116a-b provides users with an estimate of the chip size, power, leakage and cost of the final electronic product.

This provides the users of the chip planner 116, such as IC design teams, system architects and management, with the ability to visualize tradeoffs throughout the chip design flow. By bringing IP and manufacturing data to bear on the earliest stage of chip planning, the chip planner 116 enables earlier and more informed decision-making in the context of critical decisions affecting chip performance, functionality and cost. The chip planner 116 helps design teams explore a wide range of chip architecture options in literally seconds including selection of IP, technology nodes and processes, power optimization strategies, packaging and much more.

In operation, the user at user station 102 provides the chip planner 116 with a high-level design specification 104, including information such as gate counts, performance goals, off-chip bus connections, memory configurations and optional connectivity. The user will then select IP 118 to be considered either by importing IP from the user's own collection or by searching the IP catalog 112. Based upon these parameters, the chip planner 116a-b will produce chip architecture options.

An exemplary chip planner 116a-b and IP catalog 112 are available from Cadence Design Systems, of San Jose, Calif., with further information available at the following websites: www.chipestimate.com or www.cadence.com.

It is quite possible that either the user at user station 102 or the chip planner 116a-b performs a search of the IP catalog 112 for a specific item of IP to match certain requirements needs by the user for design 106, but will be unable to identify an IP block 118 that matches the user's requirements. This may be because the IP vendors 120a-c have not yet registered any IP at the IP catalog 112 that corresponds to the user's search criteria. This may also be because the user's search has returned so many items in a large list that it is very difficult or impossible for the user to efficiently determine which of the IP on the lengthy list best suits the user's needs.

Under this circumstance, with conventional technologies, the user is essentially without any recourse and will likely be unable to determine in any efficient or effective manner which of the IP vendor 120a-c can provide a suitable item of IP to the user. One reason for this is because the user does not have any easy way of determining which, if any, of the IP vendors 120a-c have already developed, have under development, or is capable of developing in the future any IP that matches the user's requirements. Given the large number of IP vendors in existence, it would be fruitless and highly inefficient for the user to individually contact each and every IP vendor 120a-c to try and find the required IP block 118.

Embodiments of the present invention addresses this problem by implementing a request manager 114, e.g., at the portal 110. The request manager 114 is responsible for accepting user requests, and for sending IP requests 122, as appropriate, to one or more of the IP vendors 120a-c. As described below, any suitable processing mechanism can be employed to determine which, if any, of the IP vendors 120a-c should be contacted with the IP request 122. The IP vendor that has an unregistered IP that can match to the IP request can then act upon the IP request 122 by contacting the user at user station 102 or can suggest an item of registered IP 118 that will fulfill the user's requirements. The contact message to the IP vendors 120a-c can be displayed on a display device and/or stored in a computer readable medium for storage and retrieval.

Figure 2:
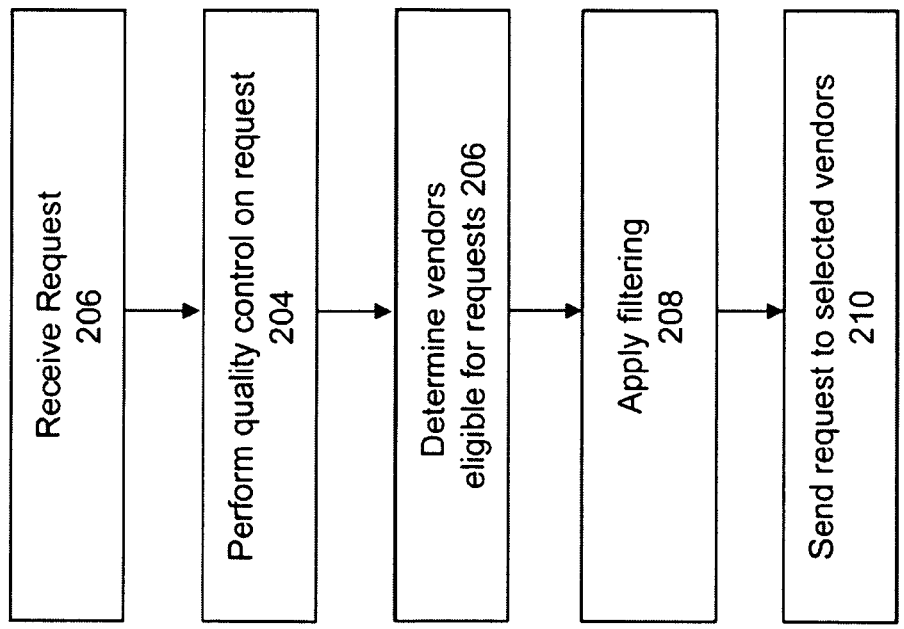
FIG. 2 shows a process for locating and identifying IP based upon IP requests according to some embodiments of the invention.

FIG. 2 shows a flowchart of a process for implementing a request manager mechanism according to some embodiments of the invention. At 202, a request is received by the request manager mechanism for an item of IP. The request may be in any form that is suitable for conveying the nature of the IP being requested. For example, the request could be implemented as an email message from the user which includes a message portion identifying the type of IP being requested. The message portion could include a text box that allows the user to insert a text description of the IP being sought. Alternatively, the request message interface could be structured to include pre-defined categories or lists of IP and parameters with selection boxes that can be "clicked" or otherwise selected by the user to more specifically define the characteristics of the IP being sought.

In some embodiments, the request can be an automatically-generated message that is created based upon the occurrence of one or more defined events. For example, if the user performs a search of the IP catalog, and the search fails to identify any IP that matches the user's search criteria, then an IP request message can be automatically generated which include a request for IP corresponding to the search criteria. In addition, the request can be automatically generated based upon activity of the chip planner mechanism. For example, if the chip planner attempts to perform estimation functionality by identifying an IP block or cell in its library which is needed to model the user's design, but the necessary cell or block is not available, then an IP request message can be generated that corresponds to the necessary cell or block. According to some embodiments, the automatically-generated requests can be edited by the user to modify or clarify the requested IP.

At 204, an optional quality control action can be performed upon the request. This action is taken to ensure that only legitimate requests are forwarded to IP vendors. There are numerous ways of checking the legitimacy of the requests and/or the requestor. One possible approach is to perform a manual process to review the request, wherein an employee responsible for the request management functionality manually reads the request to check for any objectionable or illegitimate requests. Another possible approach is to check a list of registered users to make sure that the requesting user is an authorized user of the system. Yet another quality control action could be to check whether the requester is up-to-date on any membership or usage fees that may be required to ensure the user's continued access to the IP requestor functionality. Historical data regarding past requests by the same requester can also be checked to determine whether the request should be allowed, where a history of past illegitimate requests may cause a greater scrutiny over any requests by the same user.

A list of eligible IP vendors may be identified at 206. There may be a very large number of IP vendors that are registered with the system. In some embodiments, only certain ones of the registered IP vendors are eligible to receive requests for IP blocks. There are many reasons for limiting the number of IP vendors that are eligible to receive the requests. One reason is that it is of great benefit to the IP vendor to receive a message regarding a request from a potential customer for IP, since this provides a very significant and potentially a profitable sales lead for the IP vendor. Therefore, the operator of the IP request manager may limit the list of eligible IP vendors to only those IP vendors that have provided sufficient compensation to the portal site operator. There are numerous ways to accomplish this. For example, the site operator may establish different tiers or levels of membership for registered IP vendors, where only the higher level tiers (at greater membership costs) are eligible to receive IP requests. According to some embodiments, all IP vendors that meet this eligibility requirement will receive the forwarded IP request message. Alternatively, the list of IP vendors that receive the IP request message can be further narrowed, as described further below. Another possible approach is auction or sell the right to receive IP requests only to those IP vendors that have paid or bid enough for receiving the requests. Yet another approach is to provide different pricing plans for receiving IP requests, where the pricing plans provide for receiving different numbers of IP requests based upon paying at different price points.

Filtering may be optionally applied at 208 to further narrow the list of IP vendors that receive the IP request from the user. The filtering may be performed on a subject matter basis, where lists of IP vendors are maintained for each designated type of subject matter or other filtering parameter for requests. Keywords may be identified from the request based upon a review of the IP request. Alternatively, the user may have specified one or more relevant subject matters when generating the IP request. For example, it may be determined that the IP request is for an IP block to perform PLL functionality. To filter the list of IP vendors in this circumstance, a list of IP vendors may be maintained that only include the IP vendors corresponding to PLL-related IP, where all other vendors will be filtered out based upon the presence of the PLL criteria in the IP request. The lists of IP vendors can be maintained based upon self-inclusion by vendors, historical expertise, and/or established presence of the IP vendors in particular areas. Any design, functionality, or process related criteria may be used to filter the request.

In addition, the IP vendors may provide compensation to the site operator to be included onto the filtering lists of the different subject matters. For example, the IP vendors may choose to purchase inclusion on the filtering lists on a per-list basis, with the specific lists to be selected by the IP vendors. Alternatively, the IP vendors may purchase a membership with the site operator, where the membership grants the IP vendor the right to be included on a designated number of filtering lists, with extra charges required to be listed on a greater number of filtering lists.

Thereafter, at 210, the IP request message is sent to a list of specified IP vendors. The IP vendors can then respond to the IP request by directly contacting the user that has requested the item of IP. The IP vendor may also generally respond by providing information to the publically available IP catalog to list the vendor's IP that satisfy the IP request.

Figure 3:
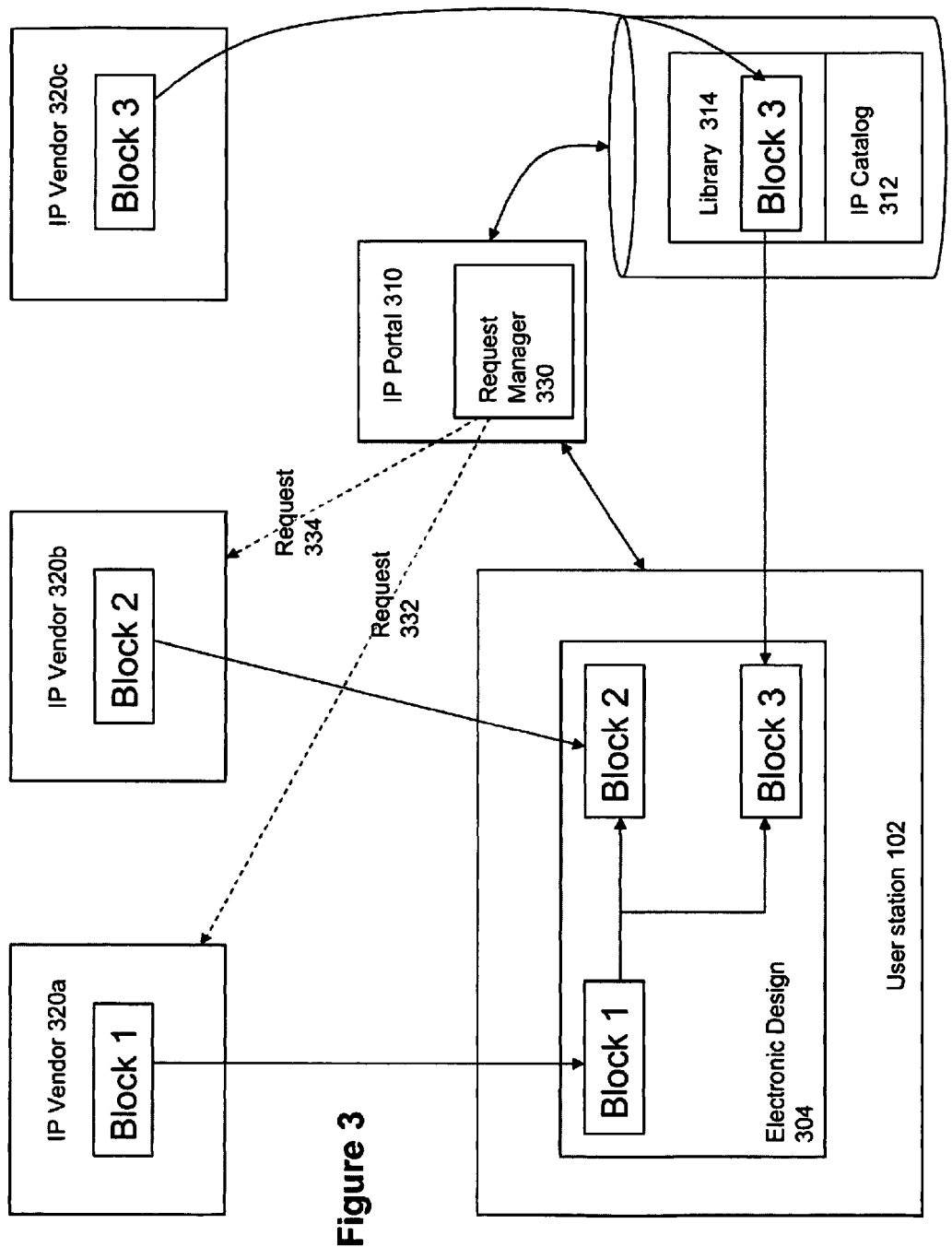
FIG. 3 illustrates identification of IP for an electronic design according to some embodiments of the invention.

FIG. 3 illustrates how the invention advantageously permits the user to obtain IP and to integrate that IP into the user's electronic products. Assume that a user at user station 302 seeks to implement an electronic design 304 that includes three IP blocks 1, 2, and 3. Further assume that the user does not have either the expertise or motivation to implement blocks 1, 2, or 3. Instead, the user is motivated to purchase or license these IP blocks from commercial IP vendors.

The user will access IP portal 310 in an effort find suitable IP from commercial IP vendors that are suitable for the user's design requirements. In particular, the user will search the IP catalog 312 using search criteria that correspond to the desired characteristics of IP blocks 1, 2, and 3.

Assume that the IP catalog only includes a suitable candidate for the IP block 3, the details of which exist in library 314. At this point, the user can purchase or license block 3 from the IP vendor 320c that has registered this IP block at portal 310. The IP block 3 can be directly retrieved from the IP vendor 320c or retrieved from the library 314.

Assume that the IP catalog does not provide any suitable candidates for IP block 1 and 2. The request manager 330 at portal 310 will send an IP request 332 corresponding to block 1 and an IP request 334 for IP block 2 to a designated list or lists of IP vendors in an effort to locate an IP vendor that can provide the requested IP to the user.

In this example scenario, at least two IP vendors 320a and 320b have chosen to respond to the IP requests 332 and 334. In particular, IP vendor 320a has responded to the IP request 332 for block 1 and IP vendor 320b has responded to the IP request 334 for block 2. In a more realistic scenario, there are likely to be multiple IP vendors that respond to the sales lead inherent in the IP requests, thereby providing the user with multiple possible choices of vendors and IP blocks to choose from. The user can thereafter engage in a commercial transaction with these IP vendors 320a and 320b to either purchase or license the IP blocks 1 and 2 to integrate into the user electronic design 304.

FIG. 4 shows an example of an interface 402 for presenting information about IP to be listed by IP vendors at an IP catalog or to be sent by a vendor in response to an IP request from a user. Each type of information is listed in a separate column in the interface 402, and corresponds to sets of information provided by a vendor to register the IP. Column 404 is used to identify the macro for a specific item of IP. Column 406 is used to identify the functional category of the IP. For example, row 420 relates to an IP block that is an analog mixed signal clock PLL as shown in column 406 for that row. Column 408 is used to provide a brief description of the IP. In the example of row 420, the description column 408 identifies the IP of that row as being a 45 nm block that operates from 25 MHz to 190 MHz.

Column 410 describes the dimensions or size of the IP block. According to some embodiments, only "hard" IP is to be registered with the dimension information, whereas "soft" IP will not be registered with this information. Column 412 describes power information about the IP. During registration of the IP, the vendor may provide related information such as leakage data, constant power data or constant leakage power data. Column 414 describes the technology node for the IP, e.g., whether the IP is for 90, 65 or 250 nm and whether the IP relates to a particular foundry process. Column 416 describes data information about the IP, such as the last date of an update or the upload date. Column 418 identifies whether the IP is to be visible to the general public, or whether access to the IP is to be only to designated parties. This option may be used, for example, to prevent competitors from viewing confidential information about one another's IP blocks. Other information may also be provided about the IP, such as the number of gates, pricing information, licensing information, etc.

According to some embodiments of the invention, multiple responses from IP vendors to a request may be sent to a location to be viewed by the user. FIG. 5 shows an example interface 502 that may be used to review the responses from IP vendors to an IP request, where the interface 502 may also be used to display the results of performing a search of an IP catalog. Each row 504 and 506 of the interface 502 relates to a separate response from an IP vendor to an IP request. Alternatively, each row 504 and 506 displays a different item of IP that matches the search criteria.

Each column of the interface 502 provides a separate item of information about the IP being presented to the user. Column 508 identifies the specific IP vendor corresponding to the IP being presented. Column 510 displays the name of the IP block to the user. Column 512 provides a brief description of the IP to the user. As is evident, any suitable item of information regarding the IP can be presented to the user using interface 502.

The present invention provides a very advantageous way for IP vendors to obtain and manage sales leads for potential customers. This is because the portal site of the present invention provides a central location that naturally lends itself to directing customers to vendors of the IP items specifically required or requested by those customers. The invention very effectively facilitates the targeted transfer of IP information regarding IP blocks from the vendors to the potential customers. In the other direction, the IP vendors receive precisely aimed information about customers that are highly motivated to purchase or license the vendor's IP.

FIG. 6 shows an example interface 602 that can be used to manage and track sales leads regarding potential customers of a vendor's IP. Each row 604, 606, and 608 of the interface 602 corresponds to a separate sales lead that has been directed to the IP vendor by the portal site.

Each column of the interface 602 corresponds to a separate item of information about the sales lead. Column 610 identifies the name of the user or entity that has initiated some activity which results in the sales lead. Column 612 contains the contact information for the user or entity identified in column 610. Column 614 displays the date that the user or entity joined the portal site. Column 616 identifies the company or organization associated with the user or entity.

Column 618 states the "origin" of the sales lead. This information identifies the basis upon the user/entity has been identified as a sales lead. For example, the lead associated with row 604 originated from an IP request that was generated by the portal site, e.g., using the process described in FIG. 2. Therefore, the lead associated with row 604 originated from the user's failure to identify a suitable IP block already registered at IP catalog at the portal site.

The lead associated with row 606 originated from the user's access over the web to information about the IP vendor's IP product, with the specific product identified in column 620. This may be considered a less critical lead, since the user may have been performing just a general browse or review of information about the vendor's IP product. However, the sales lead is generated anyway as part of the service provided to the IP vendor by the portal site, with the expectation that at lead some of the leads generated by web reviews will result in actual sales. The lead associated with row 608 originated from the usage of the vendor's IP in an actual design, e.g., based upon chip estimation for the user's electronic design using the IP vendor's IP block(s). This may be considered a much stronger lead, at least compared to lead 606.

Column 622 identifies the data on which the sales lead was generated. Column 624 identifies the number of leads generated during the present week. Column 626 identifies the number of leads generated during the last calendar quarter. Column 628 identifies to total number of sales leads.

Therefore, what has been described is an improved approach for locating and identifying IP for an electronic design. The present approach addresses the situation in which an IP catalog does not contain any IP which matches the exact requirements of an electronic design for which the IP is to be used or integrated.

System Architecture Overview

Figure 7:
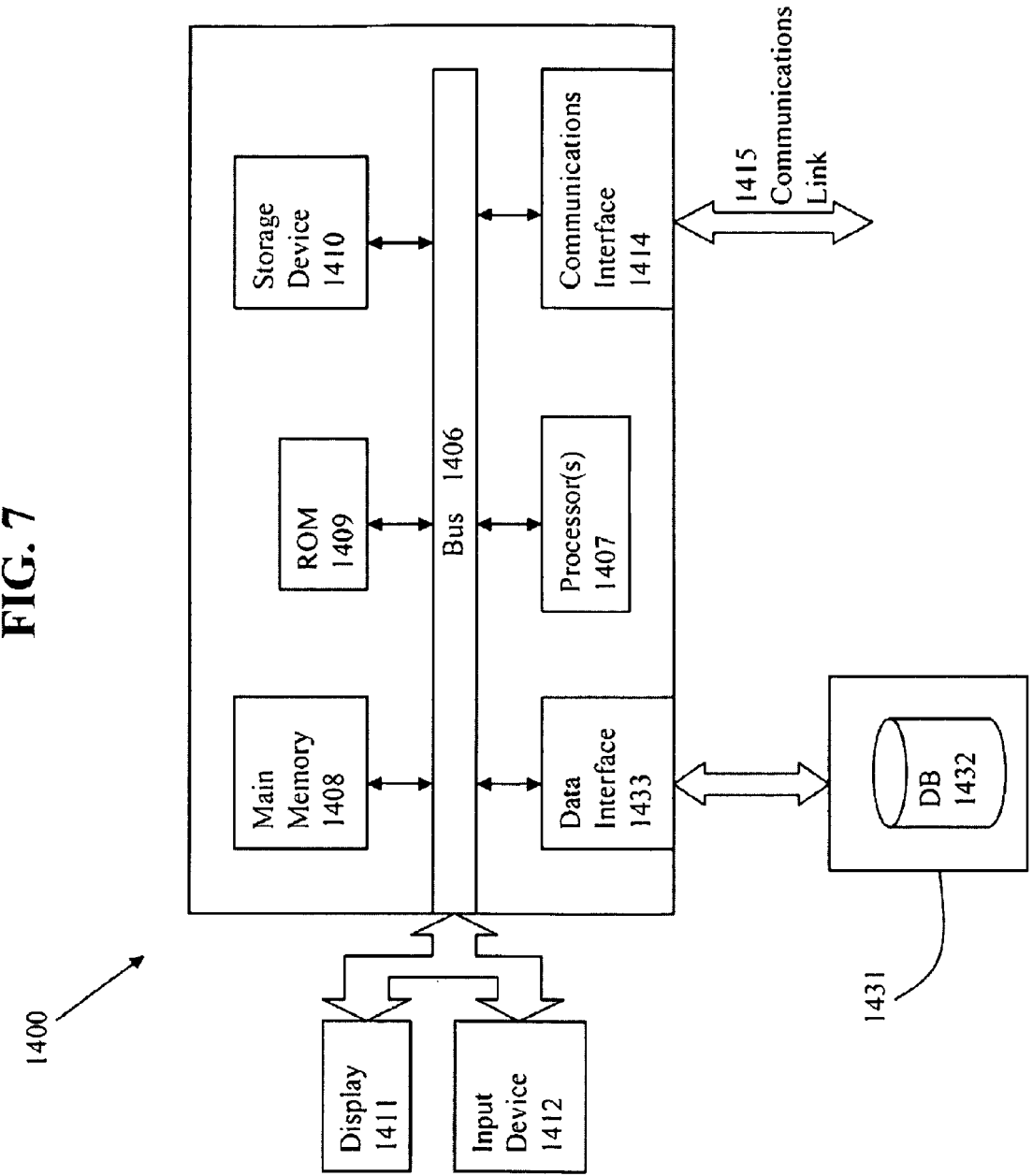
FIG. 7 shows an architecture of an example computing system with which the invention may be implemented.

FIG. 7 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for locating an IP component for an electronic design, comprising:
    performing a search of an IP catalog from a portal site for an IP component, wherein the IP component complies with a set of component requirements for an electronic design;
    determining, by using a processor, that there is an inability to identify a candidate IP component from the IP catalog that suitably corresponds to the set of component requirements for the IP component;
    based at least in part upon determining that there is the inability to identify the candidate IP component from the IP catalog that suitably corresponds to the set of component requirements for the IP component, determining an eligibility of an IP supplier from a set of a plurality of IP suppliers to be included in a subset of eligible IP suppliers based at least in part on whether the IP supplier has agreed to provide sufficient compensation to an operator of the portal site;
    generating a message to contact one or more IP suppliers from the subset of eligible IP suppliers with a request for the IP component that complies with the set of component requirements; and
    causing the message to contact the one or more IP suppliers with the request for the IP component that complies with the set of component requirement to be either displayed on a display device or stored onto a non-transitory computer readable medium.

2. The method of claim 1 in which the message comprises an email message.

3. The method of claim 1 in which the search for the IP component is based upon performance of chip planning for the electronic design, wherein the chip planning is to obtain expected characteristics or production requirements for the electronic design.

4. The method of claim 3 in which the chip planner provides an estimation of chip size, power, leakage or costs parameters for the electronic design.

5. The method of claim 4 in which the estimation is based upon analysis of specifications and requirements for the electronic design, including gate counts, performance goals, bus connections, memory configuration or connectivity.

6. The method of claim 1 in which the inability to identify the candidate IP component is based upon zero matching IP components in the IP catalog or too many IP components being returned from the search of the IP catalog.

7. The method of claim 1 in which quality control is performed upon a request for the IP component, wherein objectionable or illegitimate requests are not transmitted.

8. The method of claim 1 in which the set of one or more IP suppliers are determined based upon whether IP suppliers belong to one or more membership tiers.

9. The method of claim 1 in which the set of one or more IP suppliers are determined based upon whether IP suppliers have purchased rights to receive the message with the request.

10. The method of claim 1 in which the set of one or more IP suppliers are determined based filtering of IP suppliers for technology or keywords associated with the IP suppliers.

11. The method of claim 10 in which the IP suppliers provide compensation to be associated with the technology or the keywords.

12. A system for locating an IP component for an electronic design, comprising:
    a non-transitory computer readable storage medium comprising an IP catalog having information about one or more IP components that are available for purchase or licensing;
    a user station to access a portal site available to perform a search of the IP catalog for an IP component, wherein the IP component complies with a set of component requirements for an electronic design; and
    a processor associated with a request manager to generate a message to contact a set of one or more IP suppliers from a plurality of IP suppliers with a request for the IP component that complies with the set of component requirements, in which an IP supplier from the plurality of IP suppliers is eligible to be included in the set based at least in part on whether the IP supplier has agreed to provide sufficient compensation to an operator of the portal site, in which the message is generated based at least in part upon a determination that there is an inability to identify a candidate IP component from the IP catalog that suitably corresponds to the set of component requirements for the IP component.

13. The system of claim 12 in which the system comprises a chip planner and the search for the IP component is based upon performance of chip planner for the electronic design, wherein the chip planner obtains expected characteristics or production requirements for the electronic design.

14. The system of claim 13 in which the chip planner provides an estimation of chip size, power, leakage or costs parameters for the electronic design.

15. The system of claim 14 in which the estimation is based upon analysis of specifications and requirements for the electronic design, including gate counts, performance goals, bus connections, memory configuration or connectivity.

16. The system of claim 12 in which the inability to identify the candidate IP component is based upon zero matching IP components in the IP catalog or too many IP components being returned from the search of the IP catalog.

17. The system of claim 12 in which quality control is performed upon a request for the IP component, wherein objectionable or illegitimate requests are not transmitted.

18. The system of claim 12 in which the set of one or more IP suppliers are determined based upon whether IP suppliers belong to one or more membership tiers.

19. The system of claim 12 in which the set of one or more IP suppliers are determined based upon whether IP suppliers have purchased rights to receive the message with the request.

20. The system of claim 12 in which the set of one or more IP suppliers are determined based filtering of IP suppliers for technology or keywords associated with the IP suppliers.

21. The system of claim 20 in which the IP suppliers provide compensation to be associated with the technology or the keywords.

22. The system of claim 12 further comprising an interface for presenting information about the IP component at the IP portal.

23. The system of claim 22 in which interface comprises information about at least one of the following: macro name, category, dimension, power, technology node, date, hidden attribute, supplier name, IP name, or IP description.

24. The system of claim 12 comprising an interface for allowing the one or more IP suppliers to manage contacts from potential user of IP components.

25. The system of claim 24 in which interface comprises information about at least one of the following: user name, contact information, user joined date, user company, origin, macro name, date, or summary of leads.

26. The system of claim 25 in which the origin information comprises either chip planner access, IP catalog search, or a special request from the potential user.

27. A non-transitory computer readable medium having a set of stored instructions, an execution of which by a processor causes a process to be perform, the process comprising:
performing a search of an IP catalog from a portal site for an IP component, wherein the IP component complies with a set of component requirements for an electronic design;
determining that there is an inability to identify a candidate IP component from the IP catalog that suitably corresponds to the set of component requirements for the IP component;
based at least in part upon determining that there is the inability to identify the candidate IP component from the IP catalog that suitably corresponds to the set of component requirements for the IP component, determining an eligibility of an IP supplier from a set of a plurality of IP suppliers to be included in a subset of eligible IP suppliers based at least in part on whether the IP supplier has agreed to provide sufficient compensation to an operator of the portal site;
generating a message to contact one or more IP suppliers from the subset of eligible IP suppliers with a request for the IP component that complies with the set of component requirements; and
causing the message to contact the one or more IP suppliers with the request for the IP component that complies with the set of component requirement to be either displayed on a display device or stored.

28. The non-transitory computer readable medium of claim 27 in which the inability to identify the candidate IP component is based at least in part upon zero matching IP components in the IP catalog or too many IP components being returned from the search of the IP catalog.

* * * * *